United States Patent [19]

Sugata et al.

[11] Patent Number: 4,845,513

[45] Date of Patent: Jul. 4, 1989

[54] THERMAL RECORDING HEAD

[75] Inventors: Masao Sugata, Yokohama; Tatsuo Masaki, deceased, late of Yokohama, by Yoshiko Masaki, legal representative; Hirokazu Komuro; Shinichi Hirasawa, both of Hiratsuka; Yasuhiro Yano, Kawasaki, all of Japan

[73] Assignee: Canon Kabushiki Kaisha, Tokyo, Japan

[21] Appl. No.: 841,266

[22] Filed: Mar. 19, 1986

[30] Foreign Application Priority Data

| | | | |
|---|---|---|---|
| Mar. 23, 1985 | [JP] | Japan | 60-58848 |
| Mar. 25, 1985 | [JP] | Japan | 60-58531 |
| Mar. 25, 1985 | [JP] | Japan | 60-58533 |
| Mar. 26, 1985 | [JP] | Japan | 60-59393 |

[51] Int. Cl.[4] .......... G01D 15/10; H05B 1/00; H01C 1/012; B32B 9/00

[52] U.S. Cl. .......... 346/76 PH; 219/216; 338/309; 428/408

[58] Field of Search .......... 346/76 PH; 219/216, 219/543; 338/308, 309, 314; 427/39, 58, 96, 103, 402, 404; 428/209, 433, 408; 204/192 C, 192 R

[56] References Cited

U.S. PATENT DOCUMENTS

| | | | |
|---|---|---|---|
| 3,301,707 | 1/1967 | Loeb et al. | 428/220 |
| 3,604,970 | 9/1971 | Culbertson et al. | 313/107 |
| 3,639,165 | 2/1972 | Rairden | 428/433 |
| 3,645,783 | 2/1972 | Rupert et al. | 338/308 |
| 4,036,786 | 7/1977 | Tiedeman | 252/511 |
| 4,060,660 | 11/1977 | Carlson et al. | 428/408 |
| 4,172,718 | 10/1979 | Menzel | 75/174 |
| 4,296,309 | 10/1981 | Shinpmi et al. | 219/216 |
| 4,361,638 | 11/1982 | Higashi et al. | 430/58 |
| 4,400,410 | 8/1983 | Green et al. | 427/39 |
| 4,436,797 | 3/1984 | Brady et al. | 430/5 |
| 4,522,663 | 6/1985 | Ovshinsky et al. | 148/403 |
| 4,567,493 | 1/1986 | Ikeda et al. | 346/140 R |
| 4,568,626 | 2/1986 | Ogawa | 430/128 |
| 4,585,704 | 4/1986 | Hirai et al. | 428/446 |
| 4,597,844 | 7/1986 | Hiraki | 204/192 C |
| 4,629,514 | 12/1986 | Suda | 148/1.5 |

FOREIGN PATENT DOCUMENTS

| | | |
|---|---|---|
| 0071082 | 2/1983 | European Pat. Off. . |
| 3411702 | 10/1984 | Fed. Rep. of Germany . |
| 3316182 | 11/1984 | Fed. Rep. of Germany . |
| 3041420 | 1/1985 | Fed. Rep. of Germany . |
| 49521 | 3/1981 | Japan . |
| 42472 | 1/1983 | Japan . |
| 42473 | 10/1983 | Japan . |
| 1410876 | 10/1975 | United Kingdom . |
| 1582231 | 1/1981 | United Kingdom . |
| 2083841 | 3/1982 | United Kingdom . |
| 2109012 | 5/1983 | United Kingdom . |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A thermal recording head, which comprises at least one set of a heating resistor layer and at least one pair of electrodes electrically connected to the heating resistor layer, formed on a substrate, the heating resistor layer being composed of amorphous material comprising carbon atoms as a matrix and hydrogen atoms.

25 Claims, 4 Drawing Sheets

THERMAL RECORDING HEAD

BACKGROUND OF THE INVENTION

1. Field of the Invention

This invention relates to thermal recording head for use in a recording system utilizing a thermal energy for recording.

2. Related Background Art

The recording system utilizing thermal energy for recording has been characterized by very low noise at the recording due to the non-impacting mechanism and has been gradually regarded as important because of the possibility of colorization.

In such a recording system, recording information is transmitted to a thermal recording head, that is, an electro-thermal conversion device, in the form of an electric signal. The electro-thermal conversion device for this purpose comprising a substrate, a heating resistor layer formed thereon, and at least one pair of electrodes connected to the heating resistor layer, where the substrate means that which can support the heating resistor layer, and can comprise a support and, if required, a layer formed thereon. Generally, the thermal recording head is in a relatively small form, and thus the heating resistor layer can be in a thin film form, or in a thick film form or in a semi-conductor form. Particularly, the thin film form is preferable as a constituent member of the thermal recording head because of its less consumption of electric power than that of other forms, and also owing to a relatively good heat response, and thus its application has been increasing.

The properties required for the heating resistor layer of a thermal recording head are good heating response to a predetermined electric signal, good heat conductivity, good heat resistance to its own heat generation, an good durabilities, for example, durability against thermal hysteresis, etc. When a thermal recording head is used through a pressing contact with a heat-sensitive paper or a heat transfer ink ribbon, a small coefficient of friction on the recording medium is further required.

However, the heating resistor layers of thermal recording heads so far used have not always satisfied the required properties and further improvement in the properties has been still desired.

To improve the wearing resistance of thermal recording heads, a wearing-resistant layer has been provided on the surface of the heating resistor layer at the sacrifice of the heat response.

When recording is made in a complete dot form on a recording medium such as paper with a rough surface, etc. by means of the conventional thermal recording head, it is necessary to more strongly press the thermal recording head onto the recording medium, resulting in an accelerated wearing. Thus, further improvement in the properties has been desired.

SUMMARY OF THE INVENTION

The present invention has been made in the said prevailing situations of the prior art.

An object of the present invention is to provide a thermal recording head having a heating resistor layer with an improved heat response.

Another object of the present invention is to provide a thermal recording head having a heating resistor layer with an improved thermal conductivity.

Other object of the present invention is to provide a thermal recording head having a heating resistor layer with an improved heat resistance.

Further object of the present invention is to provide a thermal recording head having a heating resistor layer with an improved durability.

Still further object of the present invention is to provide a thermal recording head having a heating resistor layer with an improved wearing resistance.

Still further object of the present invention is to provide a thermal recording head having a heating resistor layer with a low coefficient of friction.

According to the present invention, there is provided a thermal recording head having a heating resistor layer composed of an amorphous material comprising carbon atoms as a matrix and hydrogen atoms.

DETAILED DESCRIPTION OF THE INVENTION

Figure 1:
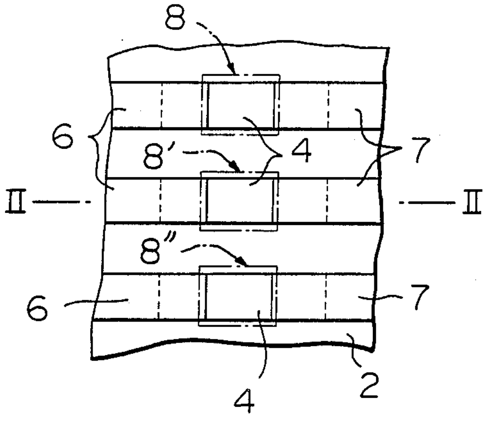
FIG. 1 is a plan view in part of a thermal recording head according to the present invention.

The present invention will be described in detail below, referring to the drawings.

Figure 2:
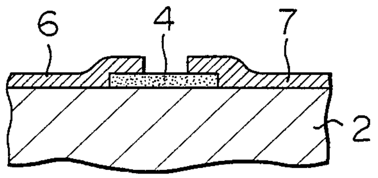
FIG. 2 is a across-sectional view along the line II—II of FIG. 1.

FIG. 1 is a plan view in part of the structure of one embodiment of the thermal recording head according to the present invention, and FIG. 2 is a cross-sectional sectional view along the line II—II of FIG. 1, where numeral 2 is a support (i.e., substrate); 4 is a heating resistor layer; 6 and 7 are a pair of electrodes. As shown in FIG. 1, a plurality of sets each of a heating resistor layer 4 and a pair of electrodes 6 and 7 connected to the heating resistor layer 4 are provided, whereby effective dot-formed, heating areas 8, 8′, 8″, . . . are formed in lines and at predetermined distances. The thermal recording head is operated to be brought into a pressing contact with a heat-sensitive paper or a heat transfer ink ribbon on the side of the heating resistor layer 4 and moved on the heat-sensitive paper or heat transfer ink ribbon in the direction of II—II, while applying an electric signal as recording information to the heating resistor layers 4 acting as the respective heating areas 8, 8′, 8″, . . . through the respective electrodes 6 and 7, when desired. The respective heating areas are heated according to the electric signal, and recording is carried out with the released thermal energy by a heat-sensitive or heat transfer system.

In the present invention, any material can be used for the support 2, but actually preferable is a material having a good adhesion to the heating resistor layer 4 and the electrodes 6 and 7 formed on the surface of the support and a good durability against the heat used when the heating resistor layer 4 and the electrodes 6 and 7 are formed or against the heat generated from the heating resistor layer 4 when operated. Furthermore, it is preferable that the support 2 has a higher electric resistance than that of the heating resistor layer 4 formed on the surface of the support 2. Furthermore, the material for the support 2 has such a thermal conductivity that the necessary and sufficient heat energy can be given to the recording medium and the response to an electric input will not be deteriorated.

Examples of materials for the support 2 for use in the present invention include inorganic materials such as glass, ceramics, silicon, etc., and organic materials such as polyamide resin, polyimide resin, etc.

In the present invention, the heating resistor layer 4 is composed of an amorphous material comprising carbon atoms as a matrix and hydrogen atoms.

An appropriate content of hydrogen atoms in the heating resistor layer 4 is selected so as to obtain the desired characteristics according to the desired application of the resistor, and is 0.0001 to 30% by atom, preferably 0.0005 to 20% by atom, more preferably 0.001 to 10% by atom.

The heating resistor layer 4 composed of an amorphous material comprising carbon atoms as a matrix and hydrogen atoms, which may be hereinafter referred merely as "a—C:H", in the present thermal recording head can be formed by vacuum deposition such as by the plasma CVD, for example, the glow discharge or by the sputtering.

To form a resistor layer 4 composed of a—C:H, for example, by the glow discharge, the following procedure is basically employed: at first, a substrate 2 is placed in a deposition chamber under reduced pressure; a feed gas capable of supplying carbon atoms (C) and another feed gas capable of supplying hydrogen atoms (H) are introduced into the deposition chamber; a glow discharge is generated in the deposition chamber with a high frequency wave or microwave to form an a—C:H layer on the surface of substrate 2.

To form a resistor layer 4 composed of a—C:H by the sputtering, the following procedure is basically employed: at first, a substrate 2 is placed in a deposition chamber under reduced pressure; a feed gas capable of supplying H is introduced into the deposition chamber when a target composed of C is sputtered in a mixed gas atmosphere based on an inert gas of Ar, He or the like or on their mixture.

To improve controlling of the resistance of a heating resistor layer, the heating resistor layer according to the present invention can contain an electroconductivity-controlling substance in addition to the hydrogen atoms.

The electroconductity-controlling substance for use in the present invenion includes the so-called impurities in the field of semi-conductors, i.e. p-type impurities having p-type conductive characteristics and n-type impurities having n-type conductive characteristics. p-Type impurities are atom species belonging to group III of the periodic table, for example, B, Al, Ga, In, Tl, etc. preferably B and Ga. n-Type impurities are atom species belonging to group V of the periodic table, for example, P, As, Sb, Bi, etc., preferably P and As. These impurities can be used alone or in a combination thereof.

An appropriate content of the electroconductivity-controlling substance in the heating resistor layer 4 can be selected so as to obtain desired characteristics according to the desired application of the resistor, and is 0.01 to 50,000 ppm by atom, preferably 0.5 to 1,000 ppm by atom, and more preferably 1 to 5,000 ppm by atom. In this case, the content of hydrogen atoms can be in the range as defined before.

The heating resistor layer 4 composed of an amorphous material comprising carbon atoms as a matrix, and hydrogen atoms and an electroconductivity-controlling substance, which may be hereinafter referred to merely as "a—C:H (p,n)", where (p-n) means an electroconductivity-controlling substance, can be formed by vacuum deposition such as by the plasma CVD, for example, the glow discharge or by the sputtering, in the same manner as in the said formation of a—C:H.

To form a resistor layer 4 composed of a—C:H (p,n), for example, by the glow discharge, the basically same procedure as in formation of the said a—C:H by the glow discharge can be employed, and a—C:H(p,n) can be likewise formed by introducing a further feed gas for supplying an electroconductivity-controlling substance into the deposition chamber. The a—C:H(p,n) can be also formed by the sputtering, i.e. by introducing a further feed gas for supplying an electroconductivity-controlling substance into the deposition chamber in addition to the feed gas used in case of forming a—C:H.

To obtain various desirable characteristics such as a heat-storing property, a heat-evolving property, an adhesion between the substrate and the resistor layer, etc., distribution of the hydrogen atoms and/or the electroconductivity-controlling substance can be made uneven in the present invention.

That is, distribution of the hydrogen atoms and/or the electroconductivity-controlling substance in the heating resistor layer 4 containing the hydrogen atoms, or the hydrogen atoms and the electroconductivity-controlling substance according to the present invention can be made uneven in the layer thickness direction. The content of the hydrogen atoms and/or the electroconductivity-controlling substance can be changed in the layer thickness direction of the heating resistor layer 4, for example, the content can be gradually increased from the substrate 2 toward the surface, or decreased to the contrary. The change in the content of the hydrogen atoms and/or the electroconductivity-controlling substance can have a maximum value or a minimum value in the resistor layer 4. The content of the hydrogen atoms and/or the electroconductivity-controlling substance can be appropriately changed in the layer thickness direction in the heating resistor layer 4 so as to obtain the desired characteristics.

In FIGS. 6 to 11 are shown specific examples of changes in the content of the hydrogen atoms and/or the electroconductivity-controlling substance in the layer thickness direction in the heating resistor layer 4 of the thermal recording head according to the present invention, where the ordinate shows the distance T in the layer thickness direction from the boundary between the substrate 2 and the layer 4, where t shows the thickness of heating resistor layer 4, and the abscissa shows the content C of hydrogen atoms and/or the electroconductivity-controlling substance. In the individual diagrams, the identical scales on the ordinate T and the abscissa C are not always used, but the scales are changed so as to show the specific features of the individual diagrams. Thus, various distributions can be actually used on the basis of differences in the specific numerical values of the individual diagrams. Of course, it is unnecessary that the distribution manner is common to each atom species.

A heating resistor layer having an uneven distribution of the content of hydrogen atoms and/or the electroconductivity-controlling substance can be formed also by the glow discharge or by the sputtering as described above. The hydrogen atoms and/or the electroconductivity-controlling substance can be unevenly distributed by changing the discharge power or feed rates of feed gases as desired.

The feed gases capable of supplying C, H, and an electroconductivity-controlling substance for use in the said procedures can be not only those in a gaseous state at the ordinary temperature and the ordinary pressure, but also substances capable of being gasified under reduced pressure.

The raw materials capable of supplying C include, for example, saturated hydrocarbons having 1 to 5 carbon atoms, ethylenic hydrocarbons having 2 to 5 carbon atoms, acetylenic hydrocarbons having 2 to 4 carbon atoms, aromatic hydrocarbons, and more specifically the saturated hydrocarbons include methane ($CH_4$), ethane ($C_2H_6$), propane ($C_3H_8$), n-butane (n-$C_4H_{10}$), and pentane ($C_5H_{12}$); the ethylenic hydrocarbons include ethylene ($C_2H_4$), propylene ($C_3H_6$), butene-1 ($C_4H_8$), butene-2 ($C_4H_8$), isobutylene ($C_4H_8$), pentene ($C_5H_{10}$); the acetylenic hydrocarbons include acetylene, ($C_2H_2$), methylacetylene ($C_3H_4$), butyne ($C_4H_6$); the aromatic hydrocarbons include benzene ($C_6H_6$), etc.

The raw materials capable of supplying H include, for example, a hydrogen gas, and hydrocarbon such as saturated hydrocarbons, ethylenic hydrocarbons, acetylenic hydrocarbons, aromatic hydrocarbons, etc. as mentioned above as the raw materials capable of supplying C.

The raw materials capable of supplying an electroconductivity-controlling substance are as follows:

The raw materials capable of supplying atom species of group III of the periodic table include, for example, boron hydrides such as $B_2H_6$, $B_4H_{10}$, $B_5H_9$, $B_5H_{11}$, $B_6H_{10}$, $B_6H_{12}$, $B_6H_{14}$, etc. and boron halides such as $BF_3$, $BCl_3$, $BBr_3$, etc. to supply boron atoms, and $AlCl_3$, $GaCl_3$, $Ga(CH_3)_3$, $InCl_3$, $TlCl_3$, etc. to supply other atom species.

The raw materials capable of supplying atom species of group V of the periodic table include, for example, phosphorus hydrides such as $PH_3$, $P_2H_4$, etc. and phosphorus halides such as $PH_4I$, $PF_3$, $PF_5$, $PCl_3$, $PCl_5$, $PBr_3$, $PBr_5$, $PI_3$, etc. to supply phosphorus atom, and $AsH_3$, $AsF_3$, $AsCl_3$, $AsBr_3$, $AsF_5$, $SbH_3$, $SbF_3$, $SbF_5$, $SbCl_3$, $SbCl_5$, $BiH_3$, $BiCl_3$, $BiBr_3$, etc. to supply other atom species. These raw materials can be used alone or in a combination thereof.

To control the content of hydrogen atoms and the electroconductivity-controlling substance to be contained in the resistor layer 4 or control the characteristics of the resistor layer 4 in the formation of the heating resistor layer, the substrate temperature, feed rates of feed gases, discharge power, pressure in the deposition chamber, etc. must be appropriately set.

The substrate temperature is 20° to 1,500° C., preferably 30° to 1,200° C., more preferably 50° to 1,100° C.

The feed rates of feed gases are selected in accordance with the desired properties of a heating resistor layer and the desired layer-forming rate.

The discharge power is 0.001 to 20 W/cm$^2$, preferably 0.01 to 15 W/cm$^2$, more preferably 0.05 to 10 W/cm$^2$.

The pressure in the deposition chamber is $10^{-4}$ to 10 Torr, preferably $10^{-2}$ to 5 Torr.

The resistor layer of the present thermal recording head prepared according to the procedure for forming a heating resistor layer as described above has characteristics similar to those of a diamond, i.e. a Vickers hardness of 1,800 to 5,000, a thermal conducitivity of 0.3 to 2 cal/cm·sec·°C., a resistivity of $10^5$ to $10^{11}$ Ω·cm, a thermal expansion coefficient of $2\times10^{-5}$ to $10^{-6}$/°C., a friction coefficient of 0.15 to 0.25, and a density of 1.5 to 3.0. Layer formation can be made with ease owing to the hydrogen atoms contained in the amorphous material, and a very good resistance control can be obtained owing to the hydrogen atoms and electroconductivity-controlling substance contained in the amorphous material.

The resistor layer 4 of the present thermal recording head has a particularly good wearing resistance, and thus the resistor layer can be made very thin. Furthermore, a very good heat response can be obtained, because no special wearing-resistant layer is required.

It is needless to say that another layer having an appropriate protective function or other functions can be provided on the heating resistor layer 4 of the present thermal recording head, and the durability can be more improved by providing, for example, a protective layer thereon.

Figure 3:
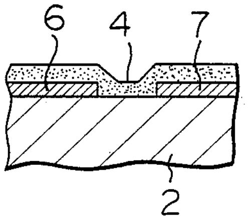
FIGS. 3 and 4 are cross-sectionl views in part of a thermal recording heads according to the present invention.

In the foregoing embodiment, it has been shown that the heating resistor layer and the electrodes are provided on the substrate in this order, but in the present thermal recording head, the electrodes and the heating resistor layer may be provided on the substrate in this order. FIG. 3 shows a cross-sectional view in part of a thermal recording head as formed in this order, where numeral 2 is a support, i.e. a substrate; 4 is a heating resistor layer; 6 and 7 are a pair of electrodes. In this case, a heating resistant layer of higher durability can be positioned on the recording medium side, and thus a very distinguished thermal recording head can be provided without providing any wearing resistant layer.

Figure 4:
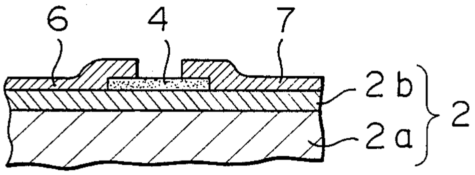

In the foregoing embodiments, the substrate is a single support 2, but may be a composite in the present invention. One embodiment of such a substrate structure is shown in FIG. 4, where the substrate 2 is a composite composed of a support 2*a* and a surface layer 2*b*. The support 2*a* can be composed of the support material as described, referring to FIG. 1 or of other metals, and the surface layer 2*b* can be composed of a material having a better adhesion to the resistor layer 4 to be formed thereon. The surface layer 2*b* can be composed of, for example, an amorphous material comprising carbon atoms as a matrix or known oxides, etc. The surface layer 2*b* can be formed on the support 2*a* by deposition in the same manner as in case of forming the heating resistor layer as described earlier, using appropriate raw materials. The surface layer 2*b* may be a glaze layer of ordinary glass.

Any material can be used for the electrodes 6 and 7 of the present thermal recording head, so long as it has a predetermined electroconductivity, and may be metal such as Au, Cu, Al, Ag, Ni, etc.

A process for preparing the present thermal recording head will be outlined below.

Figure 5:
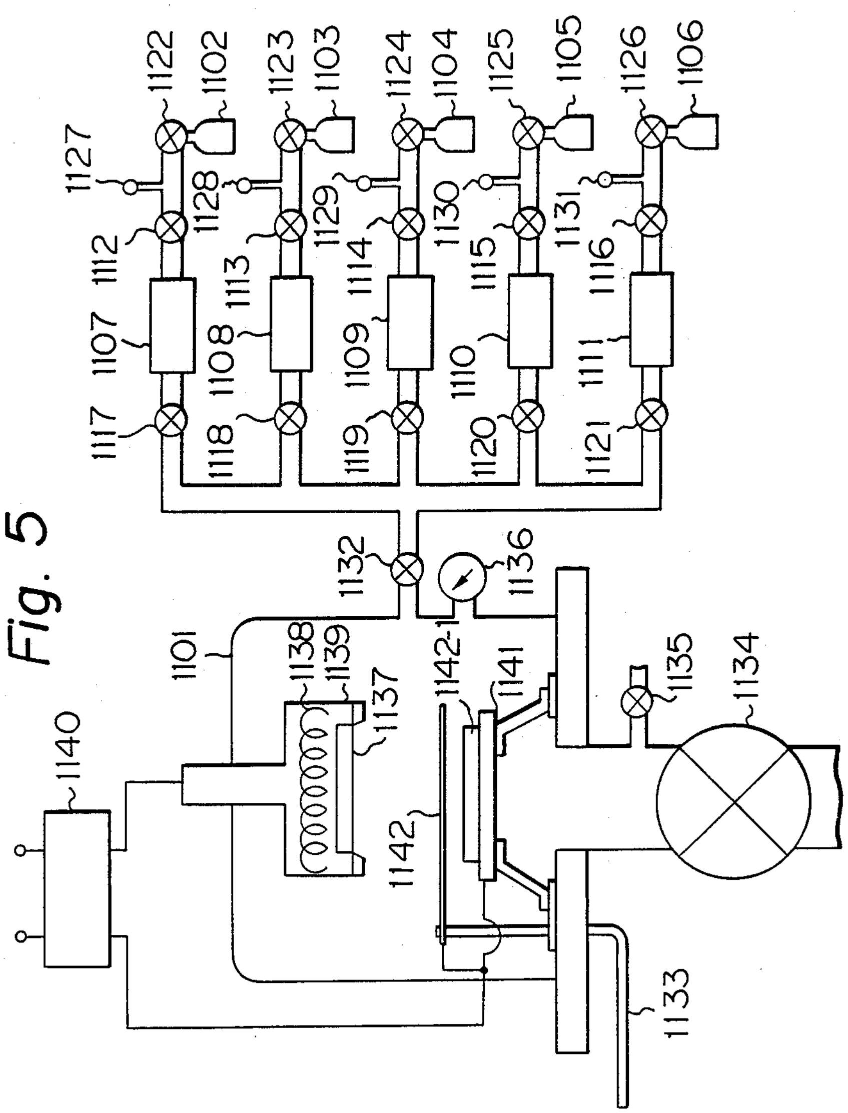
FIG. 5 is a veiw of an apparatus for use in preparing a thermal recording head according to the present invention.
Figure 6:
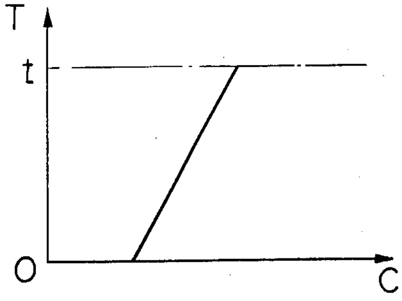
FIGS. 6–11 are diagrams showing distribution of the content of hydrogen atoms and/or electroconductivity-controlling substance in the heating resistor layer.
Figure 7:
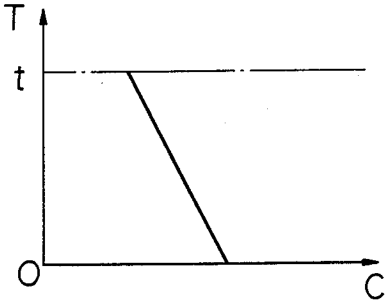
Figure 8:
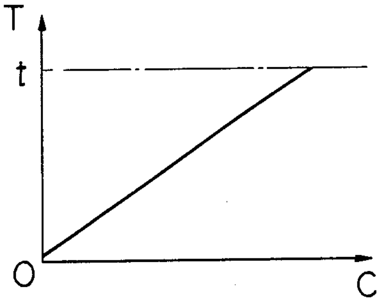
Figure 9:
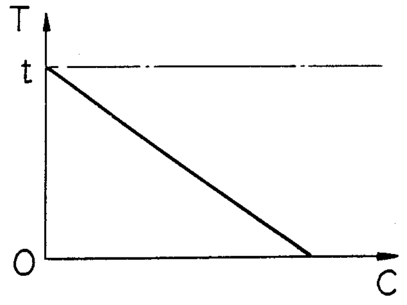
Figure 10:
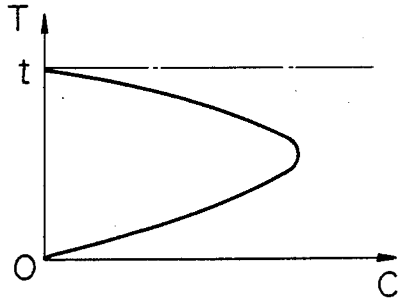
Figure 11:
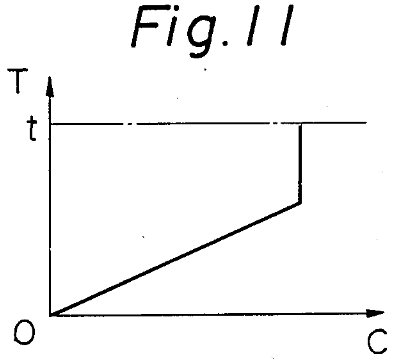

FIG. 5 is a view showing an example of an apparatus for use in forming a heating resistor layer on the surface of a substrate. Numeral 1101 is a deposition chamber, 1102–1106 are gas cylinders, 1107–1111 are mass flow controllers, 1112–1116 are inflow valves, 1117–1121 are outflow valves, 1122–1126 are gas cylinder valves, 1127–1131 are outlet pressure gauges, 1132 is an auxiliary valve, 1133 is a lever, 1134 is a main valve, 1135 is a leak valve, 1136 is a vacuum gauge, 1137 is a substrate material for a thermal recording head to be prepared, 1138 is a heater, 1139 is a means for supporting the substrate, 1140 is a high voltage power source, 1141 is an electrode, and 1142 is a shutter. Numeral 1142-1 is a target fixed to the electrode 1141 when sputtering is carried out.

For example, a $CH_4$ gas (purity: 99.9% or higher) is gas-tightly stored in 1102, and a $C_2H_6$ gas (purity: 99.9% or higher) is gas-tightly stored in 1103. Before introducing the gases from the cylinders into the deposition chamber, it must be checked that the valves 1122–1126 to the gas cylinders 1102–1106 and the leak valve 1135 are closed and that the inflow valves 1112–1116, the outflow valves 1117–1121, and the auxiliary valve 1132 are open, and then the deposition chamber 1101 and the gas pipings are at first evacuated by opening the main valve 1134. Then, when the vacuum gauge 1136 reads $1.5\times10^{-6}$ Torr, the auxiliary valve 1132, the inflow valves 1112–1116, and the outflow valves 1117–1121 are closed. The desired gas is introduced into the deposition chamber 1101 by opening the valve in the gas piping connected to the cylinder for the desired gas to be introduced to the deposition chamber 1101.

One example of a procedure for forming the resistor layer of the present thermal recording head by the glow discharge by means of the said apparatus will be described below.

The $CH_4$ gas is discharged from the gas cylinder 1102 by opening the valve 1122 to adjust the pressure at the outlet pressure gauge 1127 to 1 kg/cm$^2$, and then made to flow into the mass flow controller 1107 by gradually opening the inflow valve 1112. Then, the $CH_4$ gas is introduced into the deposition chamber 1101 by gradually opening the outflow valve 1117 and the auxiliary valve 1132, while adjusting the mass flow controller 1107 so that the flow rate of the $CH_4$ gas can reach the desired valve, and also adjusting the opening of the main valve 1134 by checking reading of the vacuum gauge 1136 so that the pressure in the deposition chamber 1101 can reach the desired valve. Then, the substrate 1137 supported by the support means 1139 in the deposition chamber 1101 is heated by the heater 1138 to reach the desired temperature, and then the shutter 1142 is opened to occasion the glow discharge in the deposition chamber 1101.

To make the distribution of hydrogen atoms uneven, the opening of the outflow valve 1117 is adjusted manually or by an externally driven motor to change the flow rate of the $CH_4$ gas along the predesigned changing curve from time to time, while maintaining the glow discharge, whereby the content of hydrogen atoms can be changed in the layer thickness direction in the resistor layer 4.

Another example of a procedure for forming the resistor layer of the present thermal recording head by the sputtering by means of the foregoing apparatus will be described below:

High purity graphite 1142-1 is placed in advance as a target on the electrode 1141 to which a high voltage is applied from the high voltage power source 1140. The $CH_4$ gas is introduced at a desired flow rate into the deposition chamber 1101 from the gas cylinder 1102 in the same manner as in case of the glow discharge. By opening the shutter 1142 and turning the high voltage power source 1140 on, the target 1142-1 is subjected to the sputtering, while heating the substrate 1137 to a desired temperature by the heater 1138 and adjusting the opening of the main valve 1134 to obtain a desired pressure in the deposition chamber 1101 in the same manner as in case of the glow discharge.

To make the distribution, of hydrogen atoms uneven in this case, the opening of the inflow valve 1117 is adjusted in the same manner as in case of the glow discharge to change the flow rate of the $CH_4$ gas along a predetermined changing curve from time to time, whereby the content of hydrogen atoms can be changed in the layer thickness direction in the resistor layer 4.

To add the hydrogen atoms and the electroconductivity-controlling substance to the heating resistor layer by means of the apparatus shown in FIG. 5, a $CH_4$ gas (purity: 99.9% or higher) diluted with an Ar gas is gas-tightly stored in 1102, a $PH_3$ gas (purity: 99.9% or higher) diluted with an Ar gas is gas-tightly stored in 1103, and a $B_2H_6$ gas (purity: 99.9% or higher) diluted with an Ar gas is gas-tightly stored in 1104, and desired gases are introduced into the deposition chamber 1101 by opening the valves in the gas pipings connected to the cylinders for the desired gases. An a—C:H(p,n) can be formed by either the glow discharge or the sputtering in the same manner as described before. The distribution of the hydrogen atoms and/or the electroconductivity-controlling substance can be made uneven also in the same manner as described before, for example, by changing the feed rates of the feed gases as desired.

In case of thermal recording heads shown in FIGS. 1 and 2, formation of a heating resistor layer on a substrate by either said glow discharge or sputtering is carried out throughout the substantially entire surface of the substate, and then formation of an electroconductive layer and etching of the electroconductive layer and the heating resistor layer by photolithography are carried out, whereby a thermal recording head having a plurality of dot-formed effective heating areas as shown in FIG. 1 can be obtained.

In case of a thermal recording head shown in FIG. 3, an electroconductive layer is formed on a substrate in advance, and then etched by photolithography. Then, a heating resistor layer is formed on the substrate by either said glow discharge or sputtering.

A thermal recording head with good heat response, thermal conductivity, heat resistance and/or durability can be provided by using an amorphous material comprising carbon atoms as matrix and hydrogen atoms as a heating resistor layer according to the present invention as described above. The heating resistor layer of the present thermal recording head can be formed with ease. Particularly, a thermal recording head having a distinguished heating resistor layer with a good wearing resistance and/or a small friction coefficient can be provided according to the present invention.

Furthermore, various characteristics such as a heat-storing property, an adhesion between the substrate and the resistor layer, etc. can be obtained with ease in the present invention, because the content of hydrogen atoms is unevenly distributed in the layer thickness direction in the heating resistor layer.

Furthermore, a thermal recording head with a considerably good resistance control can be provided because an amorphous material comprising carbon atoms as a matrix, and hydrogen atoms and an electroconductivity-controlling substance is used as a heating resistor layer. Even in this case, a thermal recording head having a distinguished heating resistor layer with a good wearing resistance and/or a small friction coefficient can be provided.

Furthermore, various characteristics such as a heat-storing property, an adhesion between the substrate and the resistor layer, etc. can be realized with ease, because the content of hydrogen atoms and/or electroconductivity-controlling substance is made uneven in the layer thickness direction in the heating resistor layer.

Specific examples of the present thermal recording head will be given below:

EXAMPLE 1

A heating resistor layer was formed on the surface of a substrate made from an alumina ceramic plate and provided with a glaze layer thereon. Deposition of the heating resistor layer was carried out by the glow discharge in an apparatus, as shown in FIG. 5, under conditions shown in Table 1, using $CH_4$ as a feed gas. During the depositing operation, the degrees of opening of the individual valves and other conditions were kept constant to form the heating resistor layer having the thickness shown in Table 1.

An Al layer was formed on the thus formed resistor layer by the electron beam-vapor deposition, and then the Al layer was etched into a desired shape by photolithography to form a plurality of pairs of electrodes.

Successively, the resistor layer at the predetermined parts was removed with a HF-based etchant by photolithography. In this Example, the size of the resistor layer between the pair of electrodes was 200 μm×300 μm. In this example, a plurality of the heating resistor elements were prepared on the same one substrate so that 7 heating elements formed between the pairs of electrodes could be arranged longitudinally.

The electrical resistance of the individual heating resistor elements on the thermal head thus obtained was measured and found to be 85 Ω.

The durability of the heating resistor elements was measured by inputting electric pulse signals to the individual heating resistor elements on the thermal head obtained in this Example. The electric pulse signals had the 50% duty, the applied voltage of 6 V, and driving frequencies of 0.5 kHz, 1.0 kHz, and 2.0 kHz. As a result it was found that in every case of driving with the different driving frequencies the heating resistor elements were not broken even after $1\times10^{10}$ electric pulse signals were input into them and their resistances were not changed substantially, either.

Then, printing of letters each consisting of 5 dots in the lateral direction and 7 dots in the longitudinal direction was caried out on a heat-sensitive recording paper sheet, and it was found that no such inconveniences as absence of dots in the recorded letters, etc. appeared even after the printing of $2\times10^9$ letters. In case of recording on a recording paper sheet through a heat-sensitive transfer ink ribbon with the thermal head of this Example by the so-called thermal transfer type, it was found that the thermal head likewise had a very good durability.

Furthermore, in case of recording on the so-called typing paper sheet with a rough surface as a recording paper sheet, it was found that the thermal head of this Example had very good durability, as compared with a conventional thermal head. That is, in the printing of letters with a conventional head, printed letters were deteriorated after the printing of 30,000,000 letters, whereas in case of printing letters with the thermal head of this Example, no poor printing appeared at all after the printing of 30,000,000 letters.

EXAMPLE 2

A heating resistor layer having the same layer thickness was formed by deposition in the same manner as in Example 1, except that $C_2H_6$ was used as a feed gas and a discharge power of 1.5 W/cm$^2$ was employed.

Then, a thermal head was prepared and the electrical pulse signals were input into it in the same manner as in Example 1. It was found that the heating resistor elements were not broken even after $1\times10^{10}$ electric pulse signals were input into it and no change in the resistance was observed.

Printing of letters was carried out on a heat-sensitive recording paper sheet, and also by a thermal transfer type on a typing paper sheet with the thermal head of this Example in the same manner as in Example 1, and it was found that the thermal head had good durability as in Example 1.

EXAMPLE 3

A heating resistor layer was formed on the surface of a substrate made from an alumina ceramic plate and provided with a glaze layer thereon. Deposition of the heating resistor layer was carried out by the sputtering in an apparatus shown in FIG. 5, using graphite having a purity of 99.9% or higher as a sputtering target and $CH_4$ as a feed gas under deposition conditions shown in Table 1. The degrees of opening of the individual valves and other conditions were kept constant during the depositing operation to form the heating resistor layer having the layer thickness shown in Table 1.

A thermal head was prepared from the thus formed resistor layer in the same manner as in Example 1, and electric pulse signals were input to the heating resistor elements of the thermal head to print letters in the same manner as in Example 1. It was found that the thermal head had good durability as in Example 1.

TABLE 1

| Example No. | Feed gas | Gas flow rate (SCCM) | Discharge power (W/cm$^2$) | Substrate temperature (°C.) | Layer thickness (Å) |
|---|---|---|---|---|---|
| 1 | $CH_4$ | 50 | 0.8 | 350 | 1000 |
| 2 | $C_2H_6$ | 50 | 1.5 | 350 | 1000 |
| 3 | $CH_4$ | 20 | 13 | 350 | 1000 |

EXAMPLE 4

A heating resistor layer having the thickness shown in Table 2 was formed in the same manner as in Example 1 except that the degree of opening of the valve was continuously changed and the flow rate of the $CH_4$ gas was changed during the depositing operation under the depositing conditions shown in Table 2, and heating resistor elements were prepared in the same manner as in Example 1, using the thus formed resistor layer. The electric resistance of the individual heating resistor elements on the thermal head thus obtained was measured and found to be 90 Ω.

Electric pulse signals were input into the individual heating resistor elements on the thermal head obtained in this Example to measure the durability of the heating resistor elements. The electric pulse signals had the 50% duty, the applied voltage of 6 V, and driving frequencies of 0.5 kHz, 1.0 kHz, and 2.0 kHz. As a result, it was found that in every case of driving with different driving frequencies the heating resistor elements were not broken even after $1\times10^{10}$ electric pulse signals were input into them and their resistances were not changed substantially, either.

Then, printing of letters each consisting of 5 dots in the lateral direction and 7 dots in the longitudinal direction was carried out on a heat-sensitive recording paper sheet, and it was found that no such inconveniences as absence of dots in the recorded letters, etc. appeared even after the printing of $2\times10^9$ letters. In case of recording on a recording paper sheet through a heat-sensitive transfer ink, ribbon with the thermal head of this Example by the so-called thermal transfer type, it was found that the thermal head likewise had a very good durability.

Furthermore, in case of recording on the so-called typing paper sheet with a rough surface as a recording paper sheet, it was found that the thermal head of this Example had very good durability, as compared with a conventional thermal head. That is, in the printing of letters with a conventional head, printed letters were deteriorated after the printing of 30,000,000 letters, whereas in case of of printing letters with the thermal head of this Example, no poor printing appeared at all after the printing of 30,000,000 letters.

EXAMPLE 5

A heating resistor layer having the same layer thickness was formed by deposition in the same manner as in Example 4, except that $C_2H_6$ was used as a feed gas and a discharge power of 1.5 W/cm$^2$ was employed.

Then, a thermal head was prepared and the electric pulse signals were input into it in the same manner as in Example 4. It was found that the heating resistor elements were not broken even after $1\times10^{10}$ electric pulse signals were input into it and any change in the resistance was not observed, either.

Printing of letters was carried out on a heat-sensitive recording paper sheet, and also as a thermal transfer type on a typing paper sheet with the thermal head of this Example in the same manner as in Example 4, and it was found that the thermal head had good durability as in Example 4.

EXAMPLE 6

A heating resistor layer having the thickness shown in Table 2 was formed in the same manner as in Example 3 except that the degrees of opening of the valves were continuously changed and the flow rate of $H_2$ gas was changed.

A thermal head was prepared in the same manner as in Example 4, using the thus formed resistor layer, and electric pulse signals were input into the heating resistor elements on the thermal head in the same manner as in Example 4. It was found that the thermal head had good durability as in Example 4.

TABLE 2

| Example No. | Feed gas | Gas flow rate (SCCM) | Discharge power (W/cm$^2$) | Substrate temperature (°C.) | Layer thickness (Å) |
|---|---|---|---|---|---|
| 4 | $CH_4$ | 50 → 20 | 0.8 | 350 | 1000 |
| 5 | $C_2H_6$ | 50 → 20 | 1.5 | 350 | 1000 |
| 6 | $H_2$ | 20 → 10 | 13 | 350 | 1000 |

EXAMPLE 7

A heating resistor layer having the thickness shown in Table 3 was formed in the same manner as in Example 1, except that a gas of $CH_4/Ar=0.5$ by volume and a gas of $PH_3/Ar=1{,}000$ ppm by volume were used as feed gases under the depositing conditions shown in Table 3, and heating resistor elements were prepared in the same manner as in Example 1, using the thus formed resistor layer. The electric resistance of the individual heating resistor elements on the thermal head thus obtained was measured and found to be 80 Ω.

Electric pulse signals were input into the individual heating resistor elements on the thermal head obtained in this Example to measure the durability of the heating resistor elements. The electric pulse signals had the 50% duty, the applied voltage of 6 V, and driving frequencies of 0.5 kHz, 1.0 kHz, and 2.0 kHz. As a result, it was found that in every case of driving with different driving frequencies the heating resistor elements were not broken even after $1\times10^{10}$ electric pulse signals were input into them and their resistances were not changed substantially, either.

Then, printing of letters each consisting of 5 dots in the lateral direction and 7 dots in the longitudinal direction was carried out on a heat-sensitive recording paper sheet, and it was found that no such inconveniences as absence of dots in the recorded letters, etc. appeared even after the printing of $2\times10^9$ letters. In case of recording on a recording paper sheet through a heat-sensitive transfer ink ribbon with the thermal head of this Example as the so-called thermal transfer type, it was found that the thermal head likewise had very good durability.

Furthermore, in case of recording on the so-called typing paper sheet with a rough surface as a recording paper sheet, it was found that the thermal head of this Example had a very good durability, as compared with a conventional thermal head. That is, in the printing of letters with a conventional thermal head, printed letters were deteriorated after the printing of 30,000,000 letters, whereas in case of printing letters with the thermal head of this Example, no poor printing appeared at all after the printing of 30,000,000 letters.

EXAMPLE 8

A heating resistor having the same layer thickness was formed by deposition in the same manner as in Example 7, except that a gas of $CH_4/Ar=0.5$ by volume and a gas of $B_2H_6/Ar=1{,}000$ ppm by volume were used as the feed gases.

Then, a thermal head was prepared and the electric pulse signals were input into it in the same manner as in Example 7. It was found that the heating resistor elements were not broken even after $1\times10^{10}$ electric pulse signals were input into it and no change in the resistance was observed.

Printing of letters was carried out on a heat-sensitive recording paper, and also as a thermal transfer type on a typing paper sheet with the thermal head of this Example in the same manner as in Example 7, and it was found that the thermal head had good durability as in Example 7.

TABLE 3

| Example No. | Feed gases | Gas flow rate (SCCM) | Dis-charge power (W/cm$^2$) | Sub-strate tempera-ture (°C.) | Layer thick-ness (Å) |
|---|---|---|---|---|---|
| 7 | $CH_4/Ar$ = 0.5 | 50 | 1.5 | 350 | 1000 |
| | $PH_3/Ar$ = 1000 ppm | 125 | | | |
| 8 | $CH_4/Ar$ = 0.5 | 50 | 1.5 | 350 | 1000 |
| | $B_2H_6/Ar$ = 1000 ppm | 125 | | | |

EXAMPLE 9

A heating resistor layer having the thickness shown in Table 4 was formed in the same manner as in Example 7, except that the degrees of opening of valves were continuously changed and the flow rate of the gas of $CH_4/Ar$ was changed during the depositing operation under the depositing conditions shown in Table 4, and heating resistor elements were prepared in the same manner as in Example 7, using the thus prepared resistor layer. The electric resistance of the individual heating resistor elements on the thermal head thus obtained was measured and found to be 85 Ω.

Electric pulse signals were input into the individual heating resistor elements on the thermal head obtained in this Example to measure the durability of the heating resistor elements. The electric pulse signals had the 50% duty, the applied voltage of 6 V, and driving frequencies of 0.5 kHz, 1.0 kHz, and 2.0 kHz. As a result, it was found that in every case of driving with different driving frequencies the heating resistor elements were not broken even after $1\times10^{10}$ electric pulse signals were input into them, and their resistances were not changed substantially, either.

Then, printing of letters each consisting of 5 dots in the lateral direction and 7 dots in the longitudinal direction was carried out on a heat-sensitive recording paper sheet, and it was found that no such inconveniences as absence of dots in the recorded letters, etc. appeared even after the printing of $2\times10^9$ letters. In case of recording on a recording paper sheet through a heat-sensitive transfer ink ribbon with the thermal head of this Example by the so-called thermal transfer type, it was found that the thermal head likewise had very good durability.

Furthermore, in case of recording on the so-called typing paper sheet with a rough surface as a recording paper sheet, it was found that the thermal head of this Example had very good durability, as compared with a conventional thermal head. That is, in the printing of letters with a conventional head, printed letters, were deteriorated after the printing of 30,000,000 letters, whereas in case of printing letters with the thermal head of this Example, no poor printing appeared at all after the printing of 30,000,000 letters.

EXAMPLE 10

A heating resistor layer having the same layer thickness was formed by deposition in the same manner as in Example 9, except that a gas of $CH_4/Ar=0.5$ by volume and a gas of $B_2H_6/Ar=1{,}000$ ppm by volume were used as the feed gases.

Then, a thermal head was prepared and the electric pulse signals were input into it in the same manner as in Example 9. It was found that the heating resistor elements were not broken even after $1\times10^{10}$ electric pulse signals were input into it and no change in the resistance was observed.

Then, printing of letters was carried out on a heat-sensitive recording paper sheet, and also by a thermal transfer type, on a typing paper sheet with the thermal head of this Example in the same manner as in Example 9, and it was found that the thermal head had very good durability as in Example 9.

EXAMPLE 11

A heating resistor layer having the same layer thickness was formed by deposition in the same manner as in Example 9, except that the flow rate of the gas of $CH_4/Ar$ was kept constant and the discharge power was continuously changed.

Then, a thermal head was prepared and the electric pulse signals were input into it in the same manner as in Example 9. It was found that the heating resistor elements were not broken even after $1\times10^{10}$ electric pulse signals were input into it and no change in the resistance was observed.

Then, printing of letters was carried out on a heat-sensitive recording paper sheet, and also by a thermal transfer type on a typing paper sheet with the thermal head of this Example in the same manner as in Example 9, and it was found that the thermal head had very good durability as in Example 9.

EXAMPLE 12

A heating resistor layer having the same layer thickness was formed by deposition in the same manner as in Example 10, except that the flow rate of the gas of $CH_4/Ar$ was kept constant and the discharge power was continuously changed.

Then, a thermal head was prepared and the electric pulse signals were input into it in the same manner as in Example 10. It was found that the heating resistor elements were not broken even after $1\times10^{10}$ electric pulse signals were input into it and no change in the resistance was observed.

Then, printing of letters was carried out on a heat-sensitive recording paper sheet, and also by a thermal transfer type on a typing paper sheet with the thermal head of this Example in the same manner as in Example 10, and it was found that the thermal head had very good durability as in Example 10.

TABLE 4

| Example No. | Feed gases | Gas flow rate (SCCM) | Dis-charge power (W/cm$^2$) | Sub-strate tempera-ture (°C.) | Layer thick-ness (Å) |
|---|---|---|---|---|---|
| 9 | $CH_4/Ar$ = 0.5 | 50 → 30 | 1.5 | 350 | 1000 |
| | $PH_3/Ar$ = 1000 ppm | 125 | | | |
| 10 | $CH_4/Ar$ = 0.5 | 50 → 30 | 1.5 | 350 | 1000 |
| | $B_2H_6/Ar$ = 1000 ppm | 125 | | | |
| 11 | $CH_4/Ar$ = 0.5 | 50 | 1.5 → 1.6 | 350 | 1000 |
| | $PH_3/Ar$ = 1000 ppm | 125 | | | |
| 12 | $CH_4/Ar$ = 0.5 | 50 | 1.5 → 1.6 | 350 | 1000 |
| | $B_2H_6/Ar$ | 125 | | | |

TABLE 4-continued

| Example No. | Feed gases | Gas flow rate (SCCM) | Dis-charge power (W/cm$^2$) | Sub-strate tempera-ture (°C.) | Layer thick-ness (Å) |
|---|---|---|---|---|---|
| | = 1000 ppm | | | | |

I claim:

1. A thermal recording head, comprising a substrate and at least one heating unit, said heating unit including (i) a heating resistor layer and (ii) at least one pair of electrodes electrically connected to the heating resistor layer, said heating unit being formed on said substrate, and said heating resistor layer being composed of an amorphous material comprising carbon atoms as a matrix and hydrogen atoms distributed unevenly therein along the thickness of the heating resistor layer.

2. A thermal recording head according to claim 1, wherein the heating resistor layer has a hydrogen atom content of 0.0001 to 30% by atom.

3. A thermal recording head according to claim 1, wherein the substrate has a surface layer composed of an amorphous material comprising carbon atoms as a matrix on the side on which the heating resistor layer is formed.

4. A thermal recording head according to claim 1, wherein the heating resistor layer has a hydrogen atom content of 0.0001 to 30% by atom.

5. A thermal recording head according to claim 1, wherein the substrate has a surface layer composed of an amorphous material comprising carbon atoms as a matrix on the side on which the heating resistor layer is formed.

6. A thermal recording head according to claim 1, wherein the hydrogen atoms are contained in a larger proportion toward the substrate side.

7. A thermal recording head according to claim 1, wherein the hydrogen atoms are contained in a smaller proportion toward the substrate side.

8. A thermal recording head according to claim 1, wherein the hydrogen atoms are contained in a larger proportion around the center of the heating resistor layer.

9. A thermal recording head according to claim 1, wherein the amorphous material for the heating resistor layer further contains an electroconductivity-controlling substance.

10. A thermal recording head according to claim 9, wherein the heating resistor layer has a hydrogen atom content of 0.0001 to 30% by atom.

11. A thermal recording head according to claim 9, wherein the heating resistor layer has an electroconductivity-controlling substance content of 0.01 to 50,000 ppm by atom.

12. A thermal recording head according to claim 9, wherein the electroconductivity-controlling substance is an atom species belonging to group III of the periodic table.

13. A thermal recording head according to claim 9, wherein the electroconductivity-controlling substance is an atom species belonging to group V of the periodic table.

14. A thermal recording head according to claim 9, wherein the substrate has a surface layer composed of an amorphous material comprising carbon atoms as a matrix on the side on which the heating resistor layer is formed.

15. A thermal recording head according to claim 9, wherein the hydrogen atoms and the electroconductivity-controlling substance are unevenly distributed in the layer thickness direction.

16. A thermal recording head according to claim 15, wherein the heating resistor layer has a hydrogen atom content of 0.0001 to 30% by atom.

17. A thermal recording head according to claim 15, wherein the heating resistor layer has an electroconductivity-controlling substance content of 0.01 to 50,000 ppm by atom.

18. A thermal recording head according to claim 15, wherein the electroconductivity-controlling substance is an atom species belonging to group III of the periodic table.

19. A thermal recording head according to claim 15, wherein the electroconductivity-controlling substance is an atom species belonging to group V of the periodic table.

20. A thermal recording head according to claim 15, wherein the substrate has a surface layer composed of an amorphous material containing carbon atoms as a matrix on the side on which the heating resistor layer is formed.

21. A thermal recording head according to claim 15, wherein the hydrogen atoms and the electroconductivity-controlling substance are contained in a larger propotion toward the substrate side.

22. A thermal recording head accoridng to claim 15, wherein the hydrogen atoms and the electroconductivity-controlling substance are contained in a smaller proportion toward the substrate side.

23. A thermal recording head according to claim 18, wherein the hydrogen atoms and the electroconductivity-controlling substance are contained in a larger proportion around the center of the heating resistor layer.

24. A thermal recording head according to claim 15, wherein the hydrogen atoms and the electroconductivity-controlling substance have different distribution curves from each other.

25. A thermal recording head according to claim 15, wherein the hydrogen atoms and the electroconductivity-controlling substance have equal distribution curves to each other.

* * * * *

UNITED STATES PATENT AND TRADEMARK OFFICE

CERTIFICATE OF CORRECTION

PATENT NO. : 4,845,513

DATED : July 4, 1989

INVENTOR(S) : MASAO SUGATA, ET AL.

It is certified that error appears in the above-identified patent and that said Letters Patent is hereby corrected as shown below:

IN [56] REFERENCES CITED

U.S. PATENT DOCUMENTS, "Shinpmi et al." should read --Shinmi et al.--.

COLUMN 1

Line 7, "a" (second occurrence) should be deleted.
Line 37, "an" should read --and--.

COLUMN 2

Line 21, "across-sectional" should read --cross-sectional--.
Line 23, "cross-sectionl" should read --cross-sectional-- and "a" should be deleted.
Line 26, "veiw" should read --view--.
Line 40, "sectional" should be deleted.

COLUMN 3

Line 22, "referred" should read --referred to--.
Line 51, "invenion" should read --invention--.
Line 52, "semi-conductors," should read --semiconductors,--.

COLUMN 4

Line 14, "formation of the" should read --the formation of--.

UNITED STATES PATENT AND TRADEMARK OFFICE
CERTIFICATE OF CORRECTION

PATENT NO. : 4,845,513

DATED : July 4, 1989

INVENTOR(S) : MASAO SUGATA, ET AL.

It is certified that error appears in the above-identified patent and that said Letters Patent is hereby corrected as shown below:

COLUMN 8

Line 4, "distribution," should read --distribution--.
Line 47, "matrix" should read --a matrix--.
Line 56, "a" should be deleted.
Line 57, "an" should be deleted.

COLUMN 9

Line 18, Close up right margin.
Line 19, Close up left margin.

COLUMN 11

Line 13, "ink," should read --ink--.
Line 24, "of of" should read --of--.
Line 37, "it" should read --them--.

COLUMN 13

Line 55, "letters," should read --letters--.

COLUMN 15

Line 9, "I claim:" should read --We claim:--.

UNITED STATES PATENT AND TRADEMARK OFFICE
CERTIFICATE OF CORRECTION

PATENT NO. : 4,845,513

DATED : July 4, 1989

INVENTOR(S) : MASAO SUGATA, ET AL.

It is certified that error appears in the above-identified patent and that said Letters Patent is hereby corrected as shown below:

COLUMN 16

Line 40, "potion" should read --portion--.
Line 41, "accoridng" should read --according--.

Signed and Sealed this

Twenty-sixth Day of February, 1991

*Attest:*

HARRY F. MANBECK, JR.

*Attesting Officer*

*Commissioner of Patents and Trademarks*